June 7, 1932.  W. A. RARIG  1,861,880

POWER DEVICE

Filed Dec. 9, 1929

INVENTOR
Walter A. Rarig
BY

ATTORNEY

Patented June 7, 1932

1,861,880

UNITED STATES PATENT OFFICE

WALTER A. RARIG, OF OAKLAND, CALIFORNIA

POWER DEVICE

Application filed December 9, 1929. Serial No. 412,820.

This invention relates to improvements in power controlling devices wherein a power plant is employed for the purpose of operating a rotary saw.

The principal object of the invention is to provide a device for automatically regulating the speed of an engine by means of a mechanism connected thereto and actuated by the movement of a traveling or movable type saw table, whereby the engine speed is increased from an "idling speed" immediately prior to the sawing operation and is restored to an "idling speed" immediately prior to the return of said table to its initial position.

With these and other objects in view, which will appear in the course of the subjoined description, the invention consists of the features of construction, combination and arrangement of parts, hereinafter described and claimed, reference being had to the accompanying drawing, in which:

Figure 1:
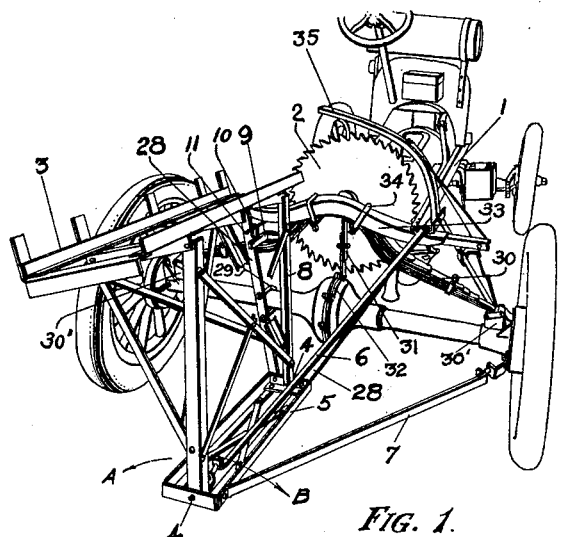
Figure 1 is a perspective view of a tilting saw table showing my device as attached to an automobile.
Figure 2:
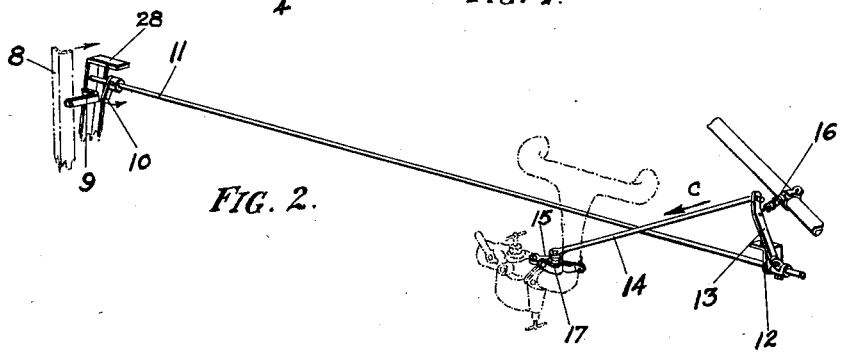
Figure 2 is a perspective view of the power plant automatic speed regulating mechanism.

In further reference to the drawing in which similar characters of reference indicate corresponding parts throughout the several views, 1 in Fig. 1 denotes the automobile frame, 2 the rotary saw mounted on the pinion receiving end of a main automobile drive shaft, 3 the tilting saw table pivotally mounted in the bearings 4 contained in the table frame 5, which frame is securely anchored and braced to the automobile frame 1 by the adjustable bar members 6 and 7, and the supporting bar members 28, one of which bar members 28 is additionally braced to the rear axle housing 32 by means of a U bolt 29 as shown. The block members 30' interposed between the rear spring 30 and the axle housing 32; and the distance bar 31 bolted at its lower end to the housing 32 and clamped at its upper end to the main automobile rear spring 30 by means of the spring clamp 34, are provided for the purpose of rigidly supporting the main automobile frame from the rear axle housing. Referring now to the automatic speed regulating mechanism, combined with the tilting saw table, the direction of travel of the table 3 is denoted by the arrows A and B. When the engine of the sawing machine is in operation, and the saw table is swung on its respective pivots toward the arrow A, and is relatively near its resting or starting position, as shown in Fig. 1, the bent arm 9, fixed to the structural member 8 is pressing against the lever 10, rotating the rod 11, journaled in the bar 28 and the supporting bracket 12 fixed to the automobile frame, as shown in Fig. 2, thereby operating the lever 13, causing the rod 14 to move in the direction of the arrow C, and the rod 14 being attached to the carburetor lever 15, therewith closes the throttle of said carburetor to a point which allows the engine to run idle or slowly as the table reaches its resting position, wherewith the bent arm 9, also serving for a table stop, contacts with the fixed bar 28. When the saw table is swung toward the arrow B, for the sawing operation, the members 9 and 10 become free from each other, and the tension spring 16 reverses the direction of action of the mechanism through the respective parts as previously described, thereby opening the throttle of said carburetor, which increases the engine speed at a time when it is most needed. The collar 17, adjustably attached to the gas manifold of the engine, shown in dot and dash lines, is provided for regulating the opening movement of the carburetor lever. By adjustment of said collar, as occasion may require, more or less gas is admitted to the engine, thereby allowing the normal maximum speed of engine to be set as may be desired. By thus automatically governing the engine so that its speed is accelerated as the saw table is moved forward for the sawing operation and thereafter retarded to an idling speed while the wood is being prepared for a subsequent sawing operation, a considerable saving of power fuel is accomplished and a consequent minimum amount of wear and tear of the machine and the securing of a greater general efficiency and durability, besides overcoming the objectionable feature of continuous high speed which causes overheating of the engine. One old method employed in the use of automobile power plants for sawing wood is to set the engine throttle so that the engine will run at a fixed speed, with the result that its speed is decreased while the material is being sawed and again increased when the sawing is completed. Another old method employed for this purpose is by the use of a governor which permits the engine to maintain the same speed continuously. Both of these methods are comparatively wasteful in fuel, cause overheating of the engine and unnecessary wear and tear of the machine.

While I have shown and described the preferred embodiment of my invention as applied to a Ford automobile, it is of course to be understood that the invention may be applied to other machines adapted for wood sawing and that I reserve the right to make such changes in the form, construction and arrangement of parts as will not depart from the spirit of the invention or the scope of the subjoined claim.

Having thus described my invention, I claim:

The combination of a motor driven sawing machine providing a work table movable from a rest position toward and from the saw of said machine, and a fuel valve having an oscillating throttle lever adapted to admit fuel to the motor of said machine, a fuel regulating device consisting of an adjustable stop member adapted to limit the opening travel movement of said lever, a spring or an elastic member connected to said lever and adapted to automatically hold said valve open to a normal "work speed" position independently of the table, and to yieldingly allow said valve to close to an "idling speed" of the motor, suitable connecting gear attached at one extremity to said lever and adapted at its other extremity to operatively engage with said table when the table is moved from the saw and is near its rest position, whereby said valve is automatically actuated to an "idling speed" by the motion of said table acting against the pressure of said spring, and to operatively disengage from the table when said table is advanced toward the saw, whereby said valve is automatically actuated to a "work speed" position by the tension of said spring.

WALTER A. RARIG.